Patented Oct. 2, 1951

2,569,883

UNITED STATES PATENT OFFICE 2,569,883

ETHERS AND ORGANIC SUBSTANCES PLASTICIZED THEREWITH

George L. Doelling, St. Louis, and Kenneth H. Adams, Fenton, Mo., assignors to Mississippi Valley Research Laboratories, Inc., St. Louis, Mo., a corporation of Missouri No Drawing. Application April 8, 1948, Serial No. 19,894

32 Claims. (Cl. 106—188)

1

This invention relates to ethers and more particularly to halonitrophenyl ethers of polypropylene glycols.

Among the objects of this invention may be noted the provision of new and useful halonitrophenyl ethers of polypropylene glycols; the provision of such ethers useful as high boiling solvents and as plasticizers for plastic and polymeric materials; and, the provision of plasticized plastic and polymeric materials. Other objects will be in part apparent and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

According to the present invention new and useful halonitrophenyl ethers of polypropylene glycols are provided having the following general structural formula:

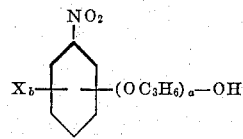

In which X is chlorine or bromine, $a$ is an integer between 2 and 20 inclusive, and $b$ is an integer between 1 and 3 inclusive. The $-(OC_3H_6)_a-OH$ group may be substituted for hydrogen in any position in the nitrobenzene ring not otherwise occupied.

The ethers of the present invention include halonitrophenyl ethers of polypropylene glycols which have one or more lower alkyl groups such as methyl, ethyl, isopropyl, etc., substituted for hydrogen in the nitrobenzene nucleus.

Among the ethers of the present invention are the tripropylene glycol mono-(4-chloro-2-nitrophenyl) ether, the tripropylene glycol mono-(2,5-dichloro-4-nitrophenyl) ether, the tripropylene glycol mono-(2-chloro-4-nitrophenyl) ether, the tripropylene glycol mono-(2,4,5-trichloro-6-nitrophenyl) ether, the tripropylene glycol mono-(4-bromo-2-nitrophenyl) ether, the dipropylene glycol mono-(2-chloro-4-nitrophenyl) ether, the dipropylene glycol mono-(4-chloro-2-nitrophenyl) ether, the dipropylene glycol mono-(2,5-dichloro-4-nitrophenyl) ether, the dipropylene glycol mono-(chloronitrotolyl) ether, the mono-(2-chloro-4-nitrophenyl) ether of a polypropylene glycol having a molecular weight of approximately 750, the mono-(2-chloro-4-nitrophenyl) ether of a polypropylene glycol having a molecular weight of approximately 400, and the mono-(2,5-dichloro-4-nitrophenyl) ether of a polypropylene glycol having a molecular weight of approximately 1200.

The ethers of the present invention are valuable high boiling solvents and plasticizers for plastic and polymeric materials. They are not only compatible with such materials, but they may be incorporated therein up to relatively high proportions and the resulting plasticized compositions show no substantial deterioration over long periods of time. The plasticized compositions formed from the ethers of the present invention and a plasticizable organic substance are not only clear when formed but remain clear over long periods of time.

The following examples illustrate the invention:

Example 1

The dipropylene glycol mono-(2-chloro-4-nitrophenyl) ether, having the formula:

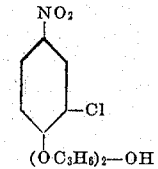

was made from 3,4-dichloronitrobenzene and dipropylene glycol, as follows:

| | Weight | Mols |
|---|---|---|
| | Grams | |
| 3,4-Dichloronitrobenzene | 128 | 0.67 |
| Dipropylene Glycol | 268 | 2.00 |
| Potassium hydroxide (90% flakes) | 49.9 | .80 |

The dichloronitrobenzene and the dipropylene glycol were charged into a 500 milliliter, 3 neck, round-bottomed flask equipped with a stirrer, a reflux condenser and inlet tube for oxygen. A stream of oxygen was bubbled through the contents of the flask all during the run. The above-mentioned materials were heated to about 68° C. and then 8 grams of the KOH were added with the stirrer running continuously. The remainder of the KOH was added in portions of 8 grams as the alkali was used up in the reaction. This was determined by titration of samples at intervals. When the reaction was complete, the mixture was poured into 1 liter of water and extracted with 200 milliliters of benzene and 75 milliliters of ether. The benzene-ether extract was washed with water several times, then the solvent removed. The weight of crude product was 165 grams. The crude product was distilled at a pressure of about 2 millimeters. The product boiled at 196° C. to 207° C., chiefly at 206–207° C. The molecular weight of the product by the camphor method was 293 compared to 289.5, the theoretical value for this compound. The dipropylene glycol mono-(2-chloro-4-nitrophenyl) ether product was a liquid, soluble in common organic solvents but soluble in water only to the extent of .13% at 24° C.

This ether is useful as a plasticizer for cellulose nitrate and cellulose acetate.

Ten grams of cellulose nitrate and 10 grams of the above dipropylene glycol mono-(2-chloro-4-nitro-phenyl) ether were dissolved in 100 milliliters of a mixture of equal parts of absolute ethyl alcohol and n-butyl acetate. About 1 or 2 milliliters of this solution were then floated onto a glass slide and the solvent allowed to evaporate. A clear flexible film resulted which remained clear. In a similar manner 10 grams of cellulose acetate and 10 grams of the above dipropylene glycol mono-(2-chloro-4-nitrophenyl) ether were dissolved in a mixture of equal parts of acetone and methyl Cellosolve. A portion of this solution was floated onto a glass slide and the solvent allowed to evaporate. A clear flexible film resulted which remained clear.

*Example 2*

The dipropylene glycol mono-(2,5-dichloro-4-nitrophenyl) ether, having the formula:

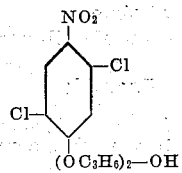

was made from 2,4,5-trichloronitrobenzene and dipropylene glycol, in a manner similar to Example 1 except that the reaction was run at 45° to 47° C. The time of reaction was 4 hours. The yield of crude product was 122 grams from 90.6 grams of trichloronitrobenzene. It distilled chiefly at 195 to 196° C. at about 1.8 millimeters. The dipropylene glycol mono-(2,5-dichloro-4-nitrophenyl) ether product was a liquid soluble in most organic solvents, but soluble in water only to the extent of .05% at 25° C.

This ether was found to be compatible with cellulose nitrate in the amount of 50% of the weight of cellulose nitrate and also in the amount of 100% of the weight of cellulose nitrate. When 5 grams of this dipropylene glycol mono-(2,5-dichloro-4-nitrophenyl) ether and 10 grams of cellulose acetate were dissolved in a mixture of acetone and methyl Cellosolve and some of this solution floated onto a glass plate and the solvent allowed to evaporate, a clear, flexible film resulted showing that this ether is compatible with cellulose acetate at least to the extent of 50% of the weight of cellulose acetate.

This ether is also compatible with ethyl cellulose. Ten grams of dipropylene glycol mono-(2,5-dichloro-4-nitrophenyl) ether and 5 grams of ethyl cellulose (48.5% ethoxy, Viscosity=46) were dissolved in a mixture of 75 milliliters of toluene and 25 milliliters of isopropyl alcohol.

A portion of this solution was floated onto a glass slide and the solvent allowed to evaporate. The resulting film was clear and flexible. Similarly a test with an equal weight of this ether and ethyl cellulose also gave a clear film, hence this ether is compatible with ethyl cellulose at least up to 100% of the weight of ethyl cellulose.

This ether is also compatible with cellulose acetate-butyrate. Tests made in a similar manner to the above show that this ether is compatible with cellulose acetate-butyrate (16% butyryl) up to at least 100% of the weight of the cellulose acetate-butyrate.

This dipropylene glycol mono-(2,5-dichloro-4-nitrophenyl) ether was also tested for compatibility with vinyl chloride-vinylidene chloride copolymer. Ten grams of vinyl chloride-vinylidene chloride copolymer (Geon 203) and 3 grams of this ether were dissolved in 130 milliliters of methyl ethyl ketone. A portion of this solution was floated onto a glass slide and the solvent was allowed to evaporate. The resultant film was flexible.

This dipropylene glycol mono-(2,5-dichloro-4-nitrophenyl) ether is also compatible with vinyl butyral up to at least 100% of the weight of the vinyl butyral. Ten grams of this ether and 10 grams of polyvinyl butyral (Vinylite XYNC) were dissolved in 100 milliliters of absolute ethyl alcohol. About 1 or 2 milliliters of the solution allowed to evaporate on a glass slide gave a permanently clear, flexible film.

*Example 3*

The dipropylene glycol mono-(chloronitrotolyl) ether, having the formula:

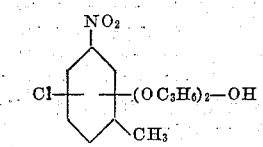

was made from 2,6-dichloro-3-nitrotoluene and dipropylene glycol in a manner similar to Example 1.

The dipropylene glycol mono-(chloronitrotolyl) ether product was a liquid which had the correct molecular weight for this ether, was soluble in common organic solvents and boiled chiefly at 175–179° C. at about 2 millimeters. It was compatible with cellulose nitrate in the amount of at least 100% of the weight of cellulose nitrate and with cellulose acetate up to at least 50% of the weight of cellulose acetate.

*Example 4*

The tripropylene glycol mono-(2-chloro-4-nitrophenyl) ether, having the formula:

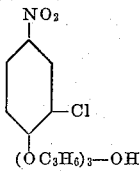

was made from 3,4-dichloronitrobenzene and tripropylene glycol, as follows:

|  | Weight | Mols |
|---|---|---|
|  | *Grams* |  |
| 3,4-Dichloronitrobenzene | 96 | 0.50 |
| Tripropylene Glycol | 345 | 1.80 |
| Sodium hydroxide (scales) | 25.3 | 0.60 |

This reaction was carried out as in Example 1. The temperature of reaction was 60-62° C. and time of reaction was 4½ hours. Oxygen was bubbled through during the reaction.

The reaction mixture was diluted with 500 milliliters of water and extracted with benzene, then the benzene extract was washed several times with water and the solvent evaporated. The product was not distilled. Yield was about 96% of theory. The tripropylene glycol mono-(2-chloro-4-nitrophenyl) ether product was a liquid which had approximately the correct molecular weight for this ether and was found to be soluble in water to the extent of 0.1% at 25° C.

This tripropylene glycol mono-(2-chloro-4-nitrophenyl) ether was tested for compatibility with cellulose nitrate and was found to be compatible at least up to 100% of the weight of cellulose nitrate. This ether was also tested for compatibility with cellulose acetate and it was found to be compatible at least up to 50% of the weight of cellulose acetate.

*Example 5*

The tripropylene glycol mono-(2,5-dichloro-4-nitrophenyl) ether, having the formula:

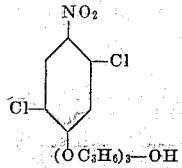

was made from 2,4,5-trichloronitrobenzene and tripropylene glycol in a manner similar to Example 2. The product was a liquid soluble in most organic solvents but soluble in water only to the extent of .04% at 25° C.

This tripropylene glycol mono-(2,5-dichloro-4-nitrophenyl) ether was tested for compatibility with cellulose nitrate in a similar manner to above examples and was found to be compatible at least up to 100% of the weight of cellulose nitrate.

*Example 6*

The tripropylene glycol mono-(4-chloro-2-nitrophenyl) ether, having the formula:

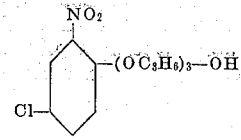

was made from 2,5-dichloronitrobenzene and tripropylene glycol, in a manner similar to previous examples. The product was an oil soluble in most organic solvents but soluble in water only to the extent of .12% at 24° C.

*Example 7*

The tripropylene glycol mono-(2,4,5-trichloro-6-nitrophenyl) ether, having the formula:

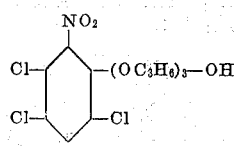

was made from 2,3,5,6-tetrachloronitrobenzene and tripropylene glycol in a manner similar to Example 2. The product was a liquid having a molecular weight by the camphor method of 413 against 416.8, the theoretical value for this compound. The product of this reaction was compatible with cellulose nitrate at least up to 100% of the weight of the cellulose nitrate.

*Example 8*

The tripropylene glycol mono-(4-bromo-2-nitrophenyl) ether, having the formula:

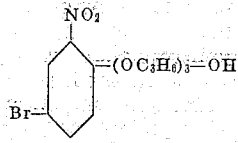

was made from 2,5-dibromonitrobenzene and tripropylene glycol in a manner similar to previous examples. The product was a liquid soluble in most organic solvents but of limited solubility in water. It was compatible with cellulose nitrate up to at least 100% of the weight of the cellulose nitrate. This ether was also found to be compatible at least up to 50% by weight of each of ethyl cellulose, polyvinylbutyral and cellulose acetate.

*Example 9*

The mono-(2-chloro-4-nitrophenyl) ether of a polypropylene glycol having a molecular weight of approximately 400, having the formula:

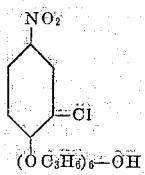

was made from 3,4-dichloronitrobenzene and hexapropylene glycol, a polypropylene glycol having a molecular weight of approximately 400 (Polyglycol P-400). The product was a liquid soluble in most organic solvents, but soluble in water only to the extent of .08% at 25° C.

This mono-(2-chloro-4-nitrophenyl) ether of hexapropylene glycol was tested for compatibility with various plastic materials by the methods described in previous examples. This ether was compatible with ethyl cellulose at least up to 100% of the weight of the ethyl cellulose. It was compatible with polyvinylbutyral (XYNC) at least up to 100% of the weight of the polyvinylbutyral. It was also compatible with cellulose acetate-butyrate (16% butyryl) at least up to 30% of the weight of the cellulose acetate-butyrate.

*Example 10*

The mono-(2-chloro-4-nitrophenyl) ether of a polypropylene glycol having a molecular weight of approximately 750, having the formula:

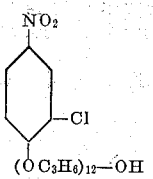

was made in a manner similar to previous examples from 3,4-dichloronitrobenzene and a polypropylene glycol having a molecular weight of approximately 750 (Polyglycol P-750). The product was a liquid soluble in most organic solvents but soluble in water only to the extent of 0.18% at 25° C.

This mono-(2-chloro-4-nitrophenyl) ether of polypropylene glycol of approximately 750 molecular weight was tested for compatibility with several plastic materials by methods described in previous examples. This ether was found to be compatible with ethyl cellulose at least up to 50% of the weight of ethyl cellulose and with polyvinylbutyral (XYNC) at least up to 50% of the weight of the polyvinylbutyral.

The halonitrophenyl ethers of polypropylene glycols may also be made by other methods. For example they may be made by reacting the corresponding halonitrophenols with propylene oxide. In general the method of preparation described in the examples should not be used in preparing halonitrophenyl ethers of polypropylene glycols where the —$(OC_3H_6)_a$—OH group is meta to the nitro group.

The halonitrophenyl ethers of polypropylene glycols of the present invention are useful as high boiling solvents and as plasticizers for plasticizable organic substances. These ethers do not have ester groups or other hydrolyzable groups and are stable and not subject to hydrolysis as are many of the plasticizers previously known, such as the phthalates, sebacates and phosphates. The plasticizers of the present invention are low in water solubility and are very low in volatility, thus tending to give permanence to plasticized compositions containing them as plasticizers.

Conventional ingredients of plasticized compositions, such as solvents, pigments and colors and fillers may likewise be incorporated into the plasticized organic substance. Lacquers, paints and impregnating compositions may be produced and films and surface-coatings as well as solid molded forms can be made with these plasticized compositions.

The proportions of the ethers used as plasticizers with different plastic and polymeric materials can be varied considerably. In general from 5% to 70% of plasticizer on the weight of the material to be plasticized, is effective.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

We claim:

1. A compound having the formula:

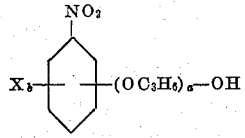

in which X is selected from the group consisting of chlorine and bromine, $a$ is an integer not less than 2 and not more than 20, and $b$ is an integer not greater than 3.

2. A compound having the formula:

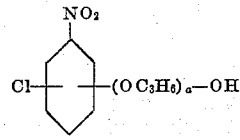

in which $a$ is an integer not less than 2 and not more than 20.

3. A compound having the formula:

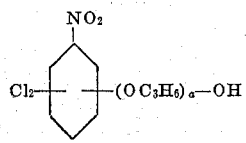

in which $a$ is an integer not less than 2 and not more than 20.

4. A compound having the formula:

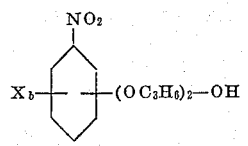

in which X is selected from the group consisting of chlorine and bromine, and $b$ is an integer not greater than 3.

5. A compound having the formula:

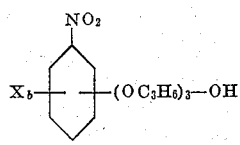

in which X is selected from the group consisting of chlorine and bromine, and $b$ is an integer not greater than 3.

6. A compound having the formula:

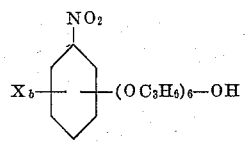

in which $b$ is an integer not greater than 3.

7. A plasticized composition comprising a plasticizable organic substance selected from the group consisting of vinyl resins, cellulose ethers and cellulose esters, and as a plasticizer therefor a compound having the formula:

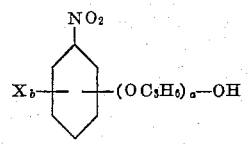

in which X is selected from the group consisting of chlorine and bromine, $a$ is an integer not less than 2 and not more than 20, and $b$ is an integer not greater than 3.

8. A plasticized composition comprising a plasticizable organic substance selected from the group consisting of vinyl resins, cellulose ethers and cellulose esters, and as a plasticizer therefor a compound having the formula:

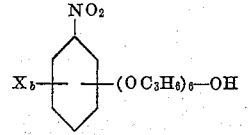

in which X is selected from the group consisting of chlorine and bromine, and $b$ is an integer not greater than 3.

9. A composition of matter comprising a vinyl resin and as a plasticizer therefor a compound having the formula:

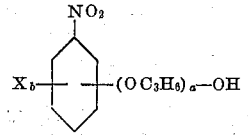

in which X is selected from the group consisting of chlorine and bromine, $a$ is an integer not less than 2 and not more than 20, and $b$ is an integer not greater than 3.

10. A composition of matter comprising a compound having the formula:

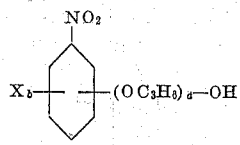

in which X is selected from the group consisting of chlorine and bromine, a is an integer not less than 2 and not more than 20, and b is an integer not greater than 3; and cellulose nitrate.

11. A composition of matter comprising a compound having the formula:

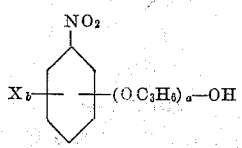

in which X is selected from the group consisting of chlorine and bromine, a is an integer not less than 2 and not more than 20, and b is an integer not greater than 3; and cellulose acetate.

12. A composition of matter comprising a compound having the formula:

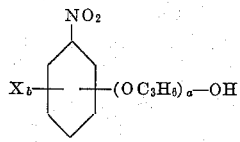

in which X is selected from the group consisting of chlorine, and bromine, a is an integer not less than 2 and not more than 20, and b is an integer not greater than 3; and ethyl cellulose.

13. A composition of matter comprising a compound having the formula:

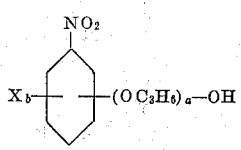

in which X is selected from the group consisting of chlorine and bromine, a is an integer not less than 2 and not more than 20, and b is an integer not greater than 3; and cellulose acetate-butyrate.

14. A placticized composition comprising a plasticizable organic substance selected from the group consisting of vinyl resins, cellulose ethers and cellulose esters, and as a plasticizer therefor a compound having the formula:

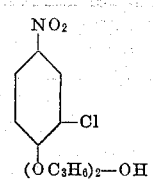

15. A plasticized composition comprising a plasticizable organic substance selected from the group consisting of vinyl resins, cellulose ethers and cellulose esters, and as a plasticizer therefor a compound having the formula:

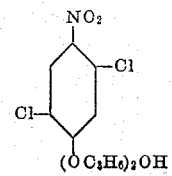

16. A plasticized composition comprising a plasticizable organic substance selected from the group consisting of vinyl resins, cellulose ethers and cellulose esters, and as a plasticizer therefor a compound having the formula:

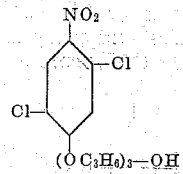

17. A plasticized composition comprising a plasticizable organic substance selected from the group consisting of vinyl resins, cellulose ethers and cellulose esters, and as a plasticizer therefor a compound having the formula:

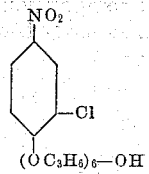

18. A plasticized composition comprising a plasticizable organic substance and as a plasticizer therefor a compond having the formula:

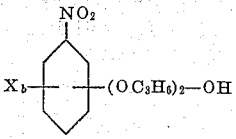

in which X is selected from the group consisting of chlorine and bromine, and b is an integer not greater than 3.

19. A plasticized composition comprising a plasticizable organic substance and as a plasticizer therefor a compound having the formula:

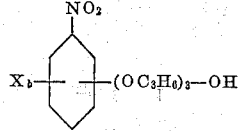

in which X is selected from the group consisting of chlorine and bromine, and b is an integer not greater than 3.

20. A compound having the formula:

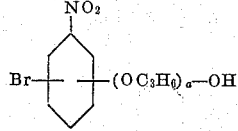

in which a is an integer not less than 2 and not more than 20.

21. A compound having the formula:

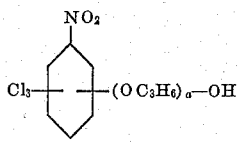

in which a is an integer not less than 2 and not more than 20.

22. A compound having the formula:

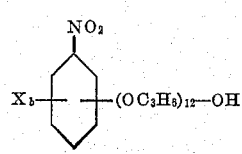

in which X is selected from the group consisting of chlorine and bromine, and $b$ is an integer not greater than 3.

23. A plasticized composition comprising a plasticizable organic substance selected from the group consisting of vinyl resins, cellulose ethers and cellulose esters, and as a plasticizer therefor a compound having the formula:

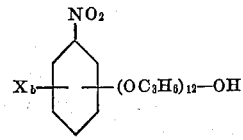

in which X is selected from the group consisting of chlorine and bromine, and $b$ is an integer not greater than 3.

24. A plasticized composition comprising ethyl cellulose and as a plasticizer therefor a compound having the formula:

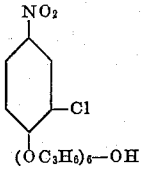

25. A plasticized composition comprising cellulose acetate and as a plasticizer therefor a compound having the formula:

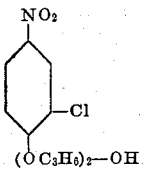

26. A plasticized composition comprising cellulose nitrate and as a plasticizer therefor a compound having the formula:

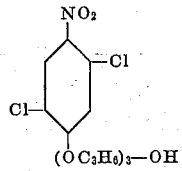

27. A plasticized composition comprising a vinyl resin and as a plasticizer therefor a compound having the formula:

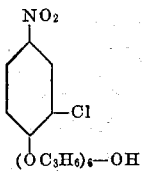

28. A plasticized composition comprising cellulose acetate-butyrate and as a plasticizer therefor a compound having the formula:

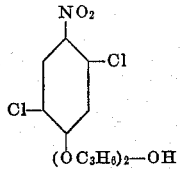

29. A compound having the formula:

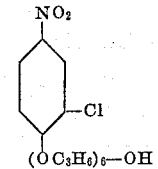

30. A compound having the formula:

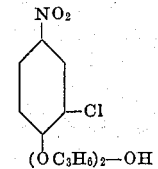

31. A compound having the formula:

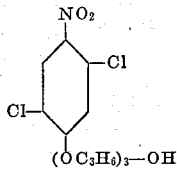

32. A compound having the formula:

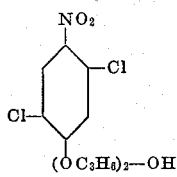

GEORGE L. DOELLING.
KENNETH H. ADAMS.

REFERENCES CITED

The following references are of record in the file of this patent:

UNITED STATES PATENTS

| Number | Name | Date |
|---|---|---|
| 2,178,831 | Bruson | Nov. 7, 1939 |
| 2,193,614 | Alexander | Mar. 12, 1940 |
| 2,322,571 | Dennison | June 22, 1943 |
| 2,416,263 | MacMullen | Feb. 18, 1947 |
| 2,450,272 | Doelling | Sept. 28, 1948 |